Sept. 11, 1956　　　　A. P. SULLIVAN　　　　2,762,568
GAS ANALYSIS AND COMBUSTION CONTROL APPARATUS
Filed Sept. 8, 1953　　　　　　　　　　　　3 Sheets-Sheet 1

INVENTOR
Alan P. Sullivan
BY
Arthur L. Wade
ATTORNEY

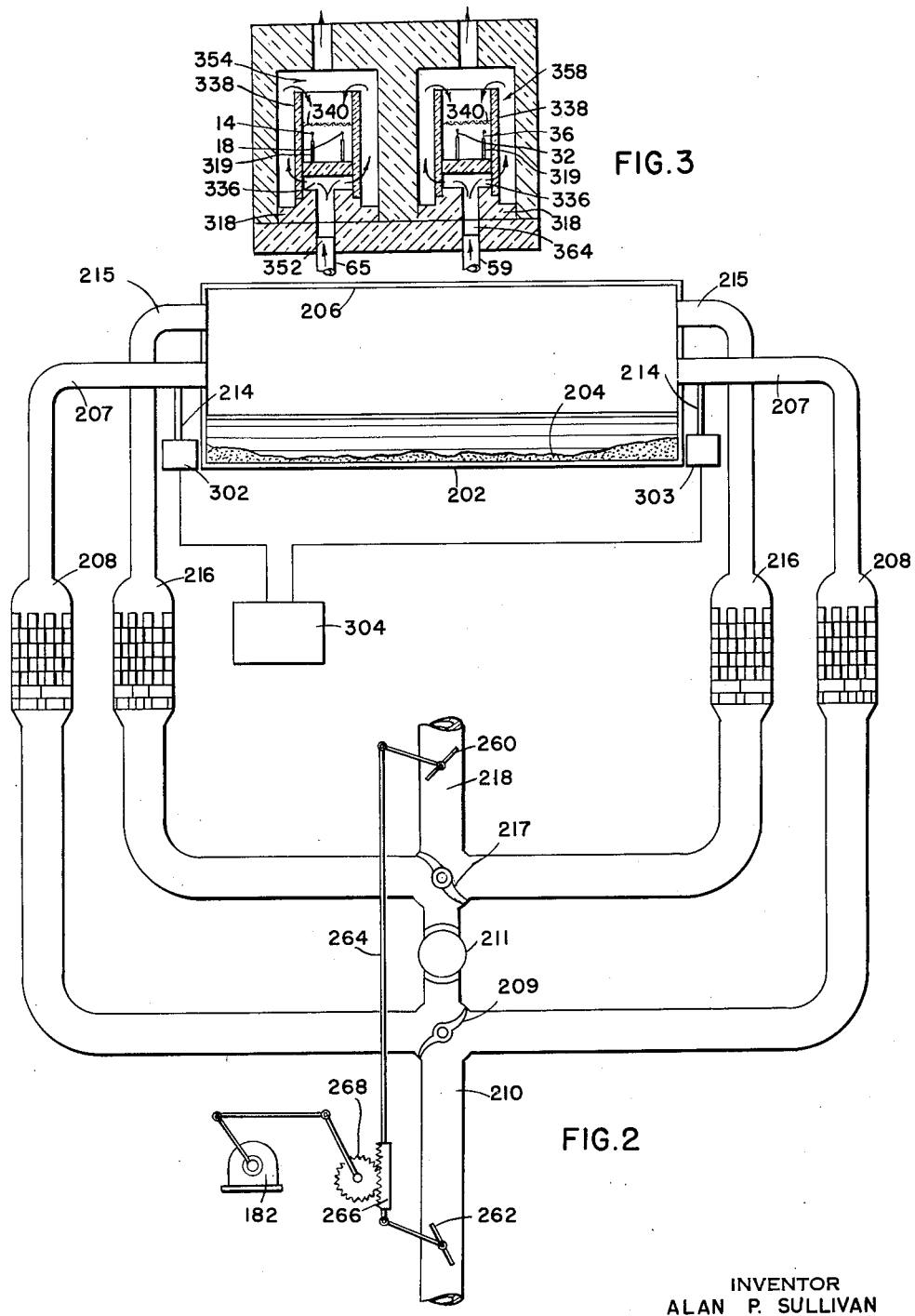

United States Patent Office 2,762,568
Patented Sept. 11, 1956

2,762,568

GAS ANALYSIS AND COMBUSTION CONTROL APPARATUS

Alan P. Sullivan, Elizabeth, N. J., assignor, by mesne assignments, to Bailey Meter Company, a corporation of Delaware Application September 8, 1953, Serial No. 378,755

7 Claims. (Cl. 236—15)

This invention relates to the analysis of gases and more particularly to the automatic and continuous determination of the presence and amount of unburned oxygen and/or of combustible components in a stream of gas, for example the exhaust gas from an engine or furnace. The invention provides gas analysis apparatus operating by the burning of the gas at the surface of an electrically heated catalyst wire. For the measurement of combustibles, the gas is passed through a cell containing a catalyst wire and air is added in a proportion more than sufficient to permit burning of the combustible ingredients, whatever the amount thereof. For the measurement of the free oxygen content of a gas under analysis, hydrogen is similarly added to a stream of the gas under test as it passes through a test cell containing such a catalyst wire. In either event, the temperature increase of the catalyst wire which results from combustion catalytically induced at its surface can be measured, for example by incorporating the catalyst wire into one leg of a Wheatstone bridge. In view of the presence of excess hydrogen and excess air in the oxygen and combustible bridges respectively, the combustion occurring is proportional to the percentage of oxygen and of combustibles present.

A difficulty with apparatus of this type as heretofore constructed resides in the maintenance of correct proportions among the arms of the Wheatstone bridge circuit both in its initial adjustment and during the progress of a long continued course of measurements. The present invention provides means whereby such zero adjustment is facilitated in the first instance, and whereby it is automatically repeated at intervals, the adjustment being made by mechanical means. The invention provides in a preferred embodiment a system of oxygen and combustibles analysis apparatus particularly adapted for use with an open hearth furnace as used in the refining of steel, it being desirable in such applications to control closely the atmosphere passing over the charge.

Figure 1:
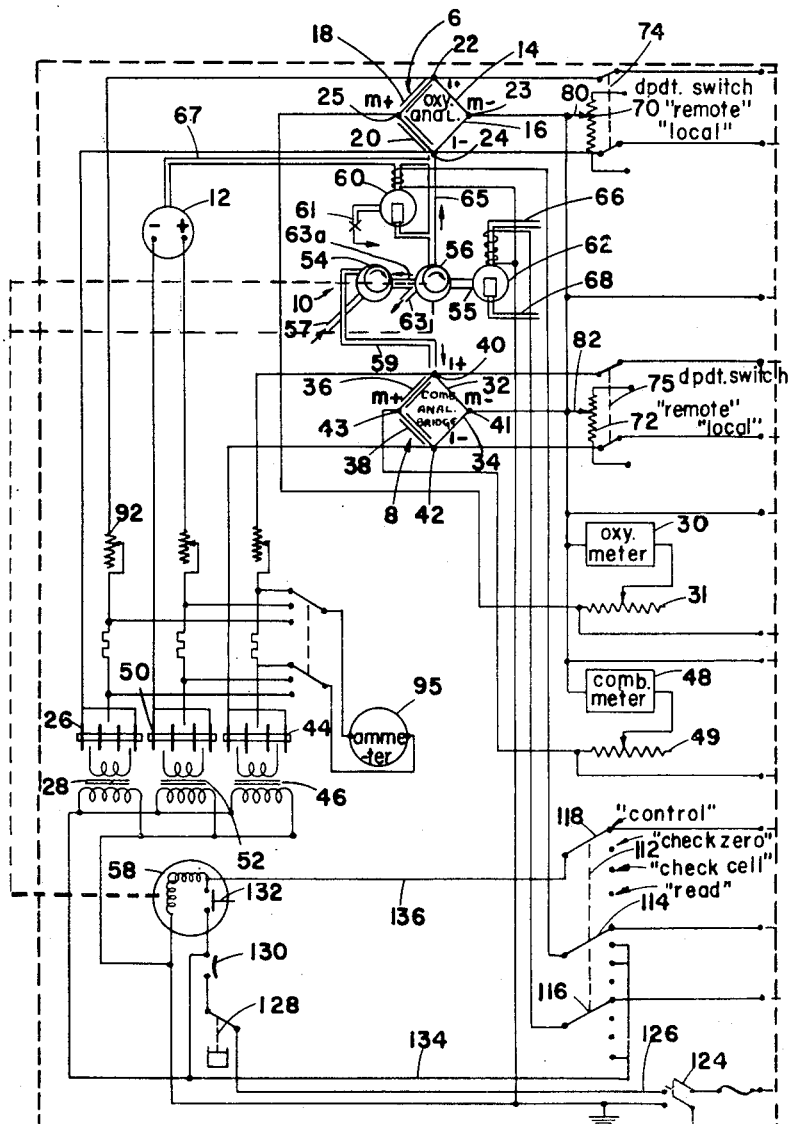
Figure 1A:
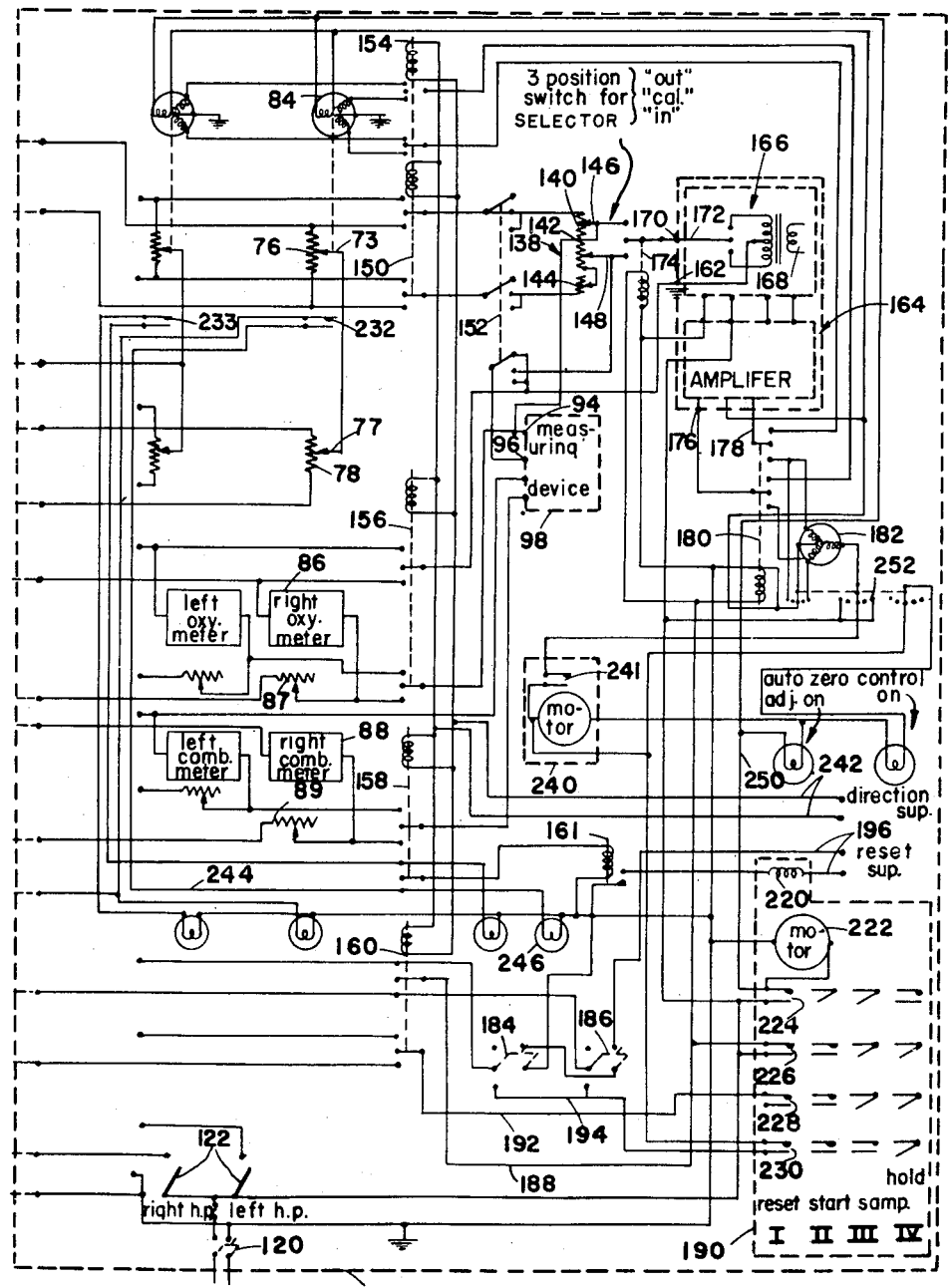

The invention will be further described in conjunction with the accompanying drawings, in which Fig. 1 is a diagrammatic representation of a gas analysis unit while Fig. 1A diagrammatically represents a control station, the two parts of the figure being intended for electrical connection as when the views are placed side by side to form the system according to the invention; Fig. 2 is a diagrammatic cross section of an open hearth furnace demonstrating the application of the system of Figs. 1 and 1A thereto; and Fig. 3 is a sectional view through a pair of test cells suitable for use in the gas analysis apparatus of Fig. 1.

The system illustrated in Figs. 1 and 1A includes broadly one or more gas analysis units each identified by the dash line box 2, associated with a control station including components enclosed within the dash line box 4. In its application to the analysis of the flue gases of an open hearth furnace as illustrated in Fig. 2, the system of Figs. 1 and 1A includes a second gas analysis unit identical to that shown in the dash line box 2, connecting to a duplicate set of terminals in the control box 4.

Referring to Fig. 2, there is shown diagrammatically in cross section an open hearth furnace arranged for gas firing. The invention is of course applicable regardless of the type of fuel employed. The furnace of Fig. 2 includes a hearth 202 on which rests a charge 204 beneath a reverberatory roof 206. At each side of the furnace a conduit 207 leads through a regenerator or brickwork 208 of honeycomb structure to a reversing valve 209 which connects the conduits 207 alternately and oppositely via a conduit 210 with a source (not shown) of gas under pressure and with an exhaust stack 211. A second pair of conduits 215, one on each side of the furnace, lead through similar regenerators 216 to a reversing valve 217 which connects the conduits 215 alternately and oppositely via a conduit 218 with a source (not shown) of air under pressure and with the stack 211.

Separate means are provided for adjusting the amount of air supplied at 218 and the amount of gas supplied at 210. These means may comprise two valves 260 and 262 positioned respectively in the conduits 218 and 210. The valves 260 and 262 are coupled together by a linkage diagrammatically indicated at 264 which is so established that the valves 260 and 262 move together but in opposite phases, i. e. when valve 260 is opening by motion of the linkage, valve 262 is closing and vice versa. The linkage 264 is shown as including a rack 266 coupled with a pinion 268 which is rotated by a motor 182. The motor 182, also shown in Fig. 1, may be called the air-fuel ratio motor and is energized to rotate in one or the opposite direction according to the departure of the exhaust gases from a desired analysis in terms of either unreacted oxygen or unburned combustibles. In practice the desired analysis includes a small percentage of unreacted oxygen.

In each of the conduits 207, or in each of the conduits 215, there is provided a sampling line 214 for the taking of exhaust gas samples for use in the analyzer apparatus of the invention.

Furnaces of this type are fired alternately from the two sides. The exhaust gases on each firing are forced through the brickworks on the exit side of the furnace, and the air and fuel are drawn in through the brickworks on the entrance side, heated on the previous firing in the opposite direction. In the installation of Figure 2 separate gas analyzer units 302 and 303 are provided on opposite sides of the furnace in relatively close position to the exhaust flues whose contents they are to analyze. The analyzer units are alternately connected electrically with a suitably located control unit 304 which develops the signals necessary to operate servo-mechanism including motor 182 which is used to adjust the air fuel ratio with which the furnace is fired in order to maintain a desired composition of the exhaust gases. Control circuits connected with the mechanism which periodically reverses the direction of firing connect the control unit first with one of the analyzer units, 303 for example when the unit is being fired from the left, and then with the analyzer unit 302 when the furnace is being fired from the right.

Combustion control may be effected according to the invention by analysis of the exhaust gases for either unburned combustible ingredients or for unreacted oxygen. The invention will be described with reference to Figure 1 in terms of an installation in which control is effected according to the percentage of unreacted oxygen present in the products of combustion. The apparatus of Figure 1 may be set to maintain the air fuel ratio for firing at the level required to maintain any desired percentage of unreacted oxygen. In the operation of open hearth furnaces unreacted oxygen percentages of from 2% to 4% by volume are typical.

Referring again to Fig. 1, the analysis unit 2 includes an oxygen analyzer bridge generally indicated at 6, a combustibles analyzer bridge generally indicated at 8, a pump generally indicated at 10 for supply to the bridges of gas to be analyzed, and of air and hydrogen, a hydrogen generator 12, and certain auxiliary elements presently to be described. The oxygen bridge includes two arms 14 and 16 of catalyst wire such as platinum or platinum alloy and two ratio arms 18 and 20. Preferably all four arms have the same resistance, and in a preferred embodiment all are of the same composition. One catalyst arm 14 and one ratio arm 18 are enclosed in a "test cell" through which the gas to be analyzed is passed by pump 10. A suitable form of cell is generally indicated at 354 in Fig. 3. Wire 14 is exposed to the gases passing through the cell whereas wire 18 is shielded therefrom for example by means of a glass coating. The other wires 16 and 20 may be enclosed in a separate chamber of the cell in a neutral atmosphere at approximately the temperature of the gases passing over wires 14 and 18. A direct current voltage is applied to the bridge at the "current" terminals 22 and 24 by means of a rectifier 26. The rectifier is fed from a transformer 28 which is energized through control wiring presently to be described. The condition of balance on the bridge 6 is read at an oxygen meter 30 connected between the "voltage" terminals 23 and 25 of the bridge. The meter 30 is of the voltmeter type but may be calibrated to read directly in percentages of oxygen by proper adjustment of a calibrating resistor 31, in accordance with procedure presently to be described.

The combustibles bridge may be similar in construction to the oxygen bridge and contains two preferably identical arms 32 and 34 of catalyst wire and two ratio arms 36 and 38. Wires 32 and 36 are enclosed in a test cell, generally indicated at 358 in Fig. 3, with wire 32 exposed to the gases and with wire 36 shielded therefrom. One form of construction for the test cells employed in the bridges is disclosed in Patent No. 2,273,981. Fig. 3 shows diagrammatically two test cells as disclosed in Patent No. 2,273,981 combined into a unitary structure for use with the oxygen and combustibles bridges 6 and 8 of Fig. 1. In Fig. 3 two cells 354 and 358 are embodied in a unitary housing comprising a block of dielectric heat insulating material. Centrally apertured dielectric plugs 318 form quickly detachable bottom closures for each of the cells 354 and 358, plugs 318 extending upwardly into the chambers of those cells. Each of these plugs carries in turn at its top a plurality of upright wire supporting rods 319. These rods also form connecting leads for electrically heated catalyst wires 14 and 18 in cell 354 and 32 and 36 in cell 358. As stated in the description of Fig. 1 wires 18 and 36 are shielded from the gases in the chambers 354 and 358, for example by means of glass coatings. Bridge arms 14 and 18 are mounted in spaced horizontal parallel relation within chamber 354 and arms 32 and 36 are similarly mounted in chamber 358.

Central apertures 352 and 364 in the plug enclosures 318 at the lower ends of the cells 354 and 358 communicate at their lower ends with the gas supply lines 65 and 59 of Fig. 1, and at their upper ends they communicate through radial apertures 336 with the interiors of the cells 354 and 358. In each of the cells 354 and 358 the two bridge arms contained therein are enclosed within a cylindrical metal shield 338 which is open at the top and which is closed at the base by the top of the plug 318. A fine mesh metal screen 340 is disposed transversely as a closure within each shield 338 at a point closely spaced above the bridge arms. Any gas (in the generic sense) flowing through either of the cells can come into contact with the catalytically active bridge arms 14 and 32 of the two cells respectively only by diffusion and convection through the metal screens 340.

In order to avoid catalyst poisoning the metal screens 340 are located in closely spaced heat transfer relation to the bridge arms. The screens function as preheaters of the gas to preheat the mixture to be analyzed prior to contact with the catalyst surface to a temperature of the order of 1,000° F. It has been found that by thus preheating the gas mixture under analysis, catalytic combustion of almost any normally catalyst poisoning combustible constituent can be effected at the optimum temperature range of 1,400° to 1,600° F. without difficulty with poisoning. In order further to insure against poisoning a coating of alkaline earth oxide may be applied to one or both of the catalyst bridge arms 14 and 32.

The bridge 8 is fed at "current" terminals 40 and 42 with a direct current voltage supplied from a rectifier 44, which is fed by a transformer 46. The condition of balance of bridge 8 is read at a combustibles meter 48 connected between voltage terminals 41 and 43, and the meter 48 may similarly be calibrated to read directly in percentages of combustible gas components.

Measurement of the percentage of oxygen in the gas under test is made by mixing that gas with hydrogen. The apparatus accordingly includes an electrolytic hydrogen cell 12 energized at a rectifier 50, which is fed from a transformer 52.

The gas under test and hydrogen are supplied to the bridge 6 on the one hand, and the gas under test and air are supplied to the combustibles bridge 8 on the other hand by means of the pump 10 and certain associated piping and valves which will now be described. The pump, shown diagrammatically in Fig. 1, is of the vane type and includes actually two separate pumps 54 and 56 driven together from a common source of power 58. The linkage between motor 58 as shown by the dotted lines and the rotors of pumps 54 and 56 has been omitted for clarity.

The pump may be of the general type described in Patent No. 2,273,981. The element 56 aspirates gas (in the generic sense) from an inlet line 55 connecting with solenoid operated "sample" valve 62. A major portion of the gas moved by the element 56 is discharged to the atmosphere at an exhaust port 63 and a portion of the remainder is delivered at a pressure substantially independent of that on the inlet side of the unit to a discharge line 65 which leads to the test cell of the oxygen bridge 6. The hydrogen generated by cell 12 is discharged to line 65 through a line 67 but will be exhausted to the atmosphere by the pressure in line 65 through a bleeder valve 61 when the "hydrogen" solenoid valve 60 is de-energized, as shown in Figure 1. Under these conditions the test cell of the oxygen bridge receives only the gas pumped by pump 56. When the hydrogen valve 60 is energized, however, the output of the cell 12 is required to flow into line 65 and thence into the test cell of the oxygen bridge.

The pumping unit 54 aspirates through a line 63a, a portion of the gas (again in a generic sense) pumped by the unit 56, mixes it with air drawn in at an inlet port 57, and discharges the resulting mixture to the test cell of the combustibles bridge 8 through line 59. The solenoid valve 62 is arranged to connect the inlet line 55 of pump unit 56 to an air intake line 66 when the valve is de-energized, as shown in Figure 1, and to a test gas line 68 when the valve is energized. The line 68 is connected to the source of the gases to be analyzed. In view of the connections of the valves 60 and 62 just described, it is clear that when both valves are de-energized air only is passed through the test cells of both bridges.

When valve 60 is energized the test cell of the oxygen bridge receives a mixture of hydrogen with air from line 66 while the combustibles bridge cell receives air only. When in addition valve 62 is energized the test cell of the oxygen bridge receives hydrogen mixed with a gas to be analyzed from line 68 and the test cell of the combustibles bridge receives air mixed with the gas to be analyzed also drawn from line 68.

Power, for example at 110 volts, 60 cycles, is supplied to the analyzer from a main power switch 120 in the control unit 4 of Fig. 1A via a secondary power switch 122 for the analyzer unit in question and via an analyzer power switch 124. With voltage on the ungrounded line 126 in the analyzer the transformers 28, 52 and 46 are energized, provided a low pressure vacuum cutout 128 and a low temperature thermostatic cutout 130 are both closed. The vacuum cutout 128 has its pneumatic element located in the sample line 68 and is adjusted to open the power circuit when the pressure in that line falls to an excessively low level, due for example to the blocking of a filter which may be interposed between the solenoid valve 62 and the port in the exhaust flue of the combustion device whose exhaust gases are to be analyzed. The thermostatic cutout 130 interrupts operation of the analyzer when the temperature of the apparatus is at too low a level for dependable operation. With the vacuum and thermostatic cutouts closed, power is applied to a line 134 which energizes certain contacts in a switch 112 presently to be described.

Assuming the vacuum and thermostatic cutouts 128 and 130 to be closed, power is applied to the pump motor 58 through a manually reset overload cutout 132. With power applied to the pump motor power is applied to a line 136 which also leads to the switch 112.

For local operation of the analyzer unit 2, each of the bridges is provided with a zero adjustment resistor, indicated at 70 for the oxygen bridge 6 and at 72 for the combustibles bridge 8. Resistors 70 and 72 are connected as voltage dividers or potentiometers, with movable contacts or taps 80 and 82 respectively connected to the voltage terminals 23 and 41 at the junctions of the active and reference catalyst arms of their respective bridges. By means of manually operated double-pole double-throw switches 74 and 75, the resistors 70 and 72 may be connected in parallel with the series connection of active and reference catalyst arms of their respective bridges ("local" setting of switches 74 and 75). With such "local" settings, adjustment of the taps 80 and 82 may be effected to bring the bridges to a state of balance as required by the relative values of their ratio arms, with air passing through the cells so that the two arms of the bridges within the test cells over which the gases to be analyzed flow during operation are brought to thermal equilibrium without any catalytic combustion on the active legs of the bridges. Such a state of balance is of course observed by noting zero deflection of the meters 30 and 48.

In the "remote" setting of switches 74 and 75 the zero adjustment resistors 70 and 72 are removed from the circuit and the current terminals of the bridges, at which the bridges are energized, are connected through appropriate wiring to the ends or fixed terminals of zero adjustment resistors or voltage dividers 76 and 78 in the control unit 4. The voltage terminals 23 and 41 of the bridges are then connected to movable contacts 73 and 77 on the resistors 76 and 78 for operation of the zero adjustment controls from the control unit. The tap 73 on resistor 76 is linked, through a slipping clutch which permits manual adjustment, to a zero adjustor motor 84. The motor 84 is energized in cyclical fashion for restoration of the zero adjustment of the oxygen bridge in the automatic operation of the apparatus presently to be described.

The meters 30 and 48 in the analyzer unit are supplemented by meters 86 and 88 in the control unit, connected respectively in parallel with meters 30 and 48, for observation at the control position of the instantaneous gas analysis.

Energization of the solenoid valves 60 and 62 is controlled at a 3-pole, 4-position switch 112 in the analyzer unit 2 and, when this switch is set for operation of the analyzer unit by the control unit, by means of further switching and timing mechanism in the control unit 4. The switch 112 includes two poles 114 and 116, one for each of the solenoid operated valves and a third pole 118 by means of which the state of operation of the pump is signalized in the control unit 4 when operation of the gas analyzer unit is effected from the control unit.

The switch 112 is arranged to permit checking of the operation of the oxygen and combustible bridge locally at the analyzer unit 2. For this purpose, the switch is provided with three positions identified in Fig. 1 as "Check zero," "Check Cell" and "Read" in addition to the "Control" position in which control of the valves is transferred to the control unit 4. In the "Check zero" position neither of the valves 60 or 62 is energized so that, upon operation of the pump, atmospheric air is sent through both of the test cells, without admixture of hydrogen in the oxygen test cell or of exhaust gases in the combustibles test cell. With switch 12 in the "Check zero" position, the "Remote-Local" switches 74 and 75 are manually set to the "Local" position and the local zero adjustment potentiometers 70 and 72 are adjusted to obtain zero readings on the oxygen and combustibles meters 30 and 48.

To check the operation of the test cells and to permit calibration of the meters 30 and 48, the switch 112 is shifted to the "Check Cell" position in which the valve 60 is energized from line 134 via pole 114 to cause delivery of hydrogen to the oxygen bridge test cell, but in which the valve 62 remains de-energized so that the pumping unit 56 continues to draw from the air inlet terminal 66. With switch 112 in the "Check Cell" position, the calibration resistor 31 in series with the oxygen meter 30 is adjusted to obtain on that meter a 21% oxygen reading corresponding to the oxygen content of the atmosphere. The hydrogen cell 12 is dimensioned to produce more than enough hydrogen to react with the oxygen present in the test cell, and the supply to the test cell of hydrogen in such amounts can be insured by adjustment of the bleeder valve 61.

For calibration of the combustibles bridge a bottle containing a gas including a known percentage of combustibles may be connected to the air inlet terminal 66. The calibration resistor 49 of the combustibles meter 48 is then adjusted to obtain on that meter a deflection corresponding to the percentage of combustibles present in the calibration gas sample.

For local operation of the gas analysis unit, as an indicating device only, the switch 112 may be set to the "Read" position in which both of the valves 60 and 62 are energized. Under these conditions the exhaust gases to be analyzed are drawn into the pumping unit 56 from the sample gas inlet terminal 68 and are delivered to the two test cells, mixed with hydrogen in the case of the oxygen bridge and mixed with air in the case of the combustibles bridge. The percentage of oxygen and of combustibles in the gas under analysis may then be read from the meters 30 and 48.

According to one feature of the invention a second voltage divider is connected in parallel with the current terminals of the bridge, either the oxygen or the combustibles bridge or both, and hence in parallel with the zero adjustment potentiometer or voltage divider thereof. An intermediate contact may be provided on this second voltage divider and connected to one of the voltage terminals of the bridge, preferably that at the junction of its ratio arms. This intermediate contact is adjusted to divide the second voltage divider into two parts having the same proportion as the ratio arms of the bridge. A second intermediate contact is provided on the second voltage divider and furnishes a voltage different from that established by the ratio arms of the bridge by an amount corresponding to any desired amount of combustion at the active catalyst arm of the bridge. By measuring and amplifying the voltage between this second intermediate contact of the second voltage divider and the voltage at the junction of the active and reference catalyst arms, an error voltage is developed corresponding in magnitude and sign to the departure of the exhaust gases under analysis from the composition desired therefor. This error voltage is then employed to govern a servo system which operates on the firing mechanism of the combustion device whose exhaust gases are being analyzed, to correct the air-fuel ratio of the firing mechanism until the error voltage disappears.

According to another feature of the invention the voltage measuring and amplifying device is periodically connected to the first intermediate contact on the second voltage divider, and while it is so connected, air is passed through the test cell of the bridge. The error voltage then appearing at the output of the amplifier measures the departure of the zero adjustment on the first voltage divider from the correct value, and the amplifier output is connected to a servo system which restores the zero adjustment at the movable contact on the first voltage divider to the correct setting.

Correction of this type is required periodically because of secular changes in the value of the active catalyst wire. This wire is heated by the energizing current applied to the bridge to some 1200° or 1400° F., corresponding to the catalytic ignition temperature of the combustion constituents in the gas to be analyzed. Catalytic combustion, when it occurs, raises this temperature some 200° F. or more higher. At these temperatures the active catalyst wire undergoes a slow evaporation which reduces its cross section and increases its resistance.

These features of the invention are embodied, in the example of the invention illustrated in Fig. 1A, in elements of structure located in the control unit 4, which will now be described.

It has been stated that the control unit includes voltage dividers 76 and 78 for zero adjustment of the bridges upon remote operation of the analyzer units from the control unit. In addition the control unit includes, in the embodiment illustrated, a second voltage divider for the oxygen bridge. This second voltage divider is generally indicated at 138. The divider 138 is shown as made up of three elements, an "Equalizer" resistor 140, a "Selector" resistor 142 and a "Scale Adjuster" resistor 144. A first intermediate contact 146 engages the equalizer 140 and divides the voltage divider into two parts having the same proportions as the ratio arms 18 and 20 of the oxygen bridge. Adjustment to this condition may be obtained either by making the contact 146 a movable one or by making the scale adjuster resistor 144 adjustable, as indicated, or by both means. A second intermediate contact 148 engages the selector resistor. The selector is preferably arranged as a potentiometer on which the contact 148 is movable from a front panel control of the control unit. This control may be calibrated directly in percentages of oxygen, and it is at the contact 148 that the percentage of oxygen to be maintained in the exhaust gases is set.

The divider 138 is connected to the current terminals 22 and 24 of the bridge via the contacts of a relay 150 presently to be described, in two of the three positions of a three-pole three-position switch generally indicated at 152. The positions of this switch in which the divider 138 is so connected are referred to in the drawing as "In" and "Calibrate."

Relay 150 is one of a series of relays 150, 154, 156, 158 and 160 which connect the control unit alternatively with the gas analyzer unit 2 shown and with the second gas analyzer unit of the installation illustrated in Fig. 2.

The voltage terminal 23 of the bridge 6 is brought into the control unit via relay 156 and thence to one input terminal 162 of a voltage amplifying and measuring device generally indicated at 164. In the embodiment illustrated this device includes a voltage chopper generally indicated at 166. In the chopper a transformer 168 includes a center tapped primary winding to which the input terminal 162 is connected. In the device 164 the other input terminal 170 connects with a reed 172 which vibrates to contact successively the ends of the primary winding of transformer 168. The reed is subjected to this vibratory movement by any suitable apparatus such as a coil, not shown, supplied with an A. C. voltage and positioned so that its field embraces the reed which is either made of magnetic material or carries a magnetic armature.

Externally of the device 164 its terminal 170 is connected by a relay 174 alternately with the two intermediate contacts 146 and 148 on the voltage divider 138. The output of the amplifier 164 appearing at terminals 176 and 178 is connected via a relay 180 either to a motor 182 which is coupled to the air-fuel ratio governing mechanism of the combustion device or to the Zero Adjuster motor 84 which corrects the setting of the movable contact 73 on the Zero Adjuster resistor 76 of the oxygen bridge. Relay 180 has its coil connected in parallel with that of relay 174 for operation by timing mechanism yet to be described, and the contacts of the two relays are so established that when the amplifier input terminal 170 is connected to the first intermediate contact 146, the amplifier output is applied to the Zero Adjuster motor 84. Conversely when the amplifier terminal 170 is connected to the second intermediate contact which selects a desired oxygen percentage at the Selector resistor 142, the amplified output is applied to the air-fuel ratio control motor 182. By proper attention within device 164 to the phase relationships between the elements of the amplifier which govern the motion of reed 172 and the components which amplify the signal appearing in transformer 168, the output signal at terminals 176 and 178 is given the sign required to rotate motor 84 in the direction which reduces the error voltage appearing at the input to the amplifier when terminal 170 is connected to contact 146. Similarly the output signal from the amplifier possesses the sign necessary to rotate the motor 182 in the proper sense to change the air-fuel ratio of the combustion device in the direction required to reduce the error voltage at the input to the amplifier when terminal 170 is connected to the second intermediate contact 148.

The control unit contains components whereby the zero setting of the bridges and the calibration of the meters 86 and 88 can be initially adjusted manually, and whereby the elements of the second voltage divider 138 can be properly proportioned so that the direct calibration in oxygen of the settings of the second intermediate contact 148 on the Selector resistor 142 will correctly correspond to the oxygen percentages maintained in the exhaust gases under analysis when the apparatus is set for automatic control. The oxygen and combustibles meters 86 and 88 have been already referred to, and they are connected in series with calibration resistors 87 and 89 similar to the calibration resistors 31 and 49 in the analyzer units. Within the control unit, the analyzer units are set for checking of the zero adjustment of their bridges, for checking of the calibration of the oxygen and combustibles meters 86 and 88, and for automatic operation to control the air-fuel ratio of the combustion device, by means of two three-position double-pole switches 184 and 186, one associated with each of the two analyzer units of the system. In the center or "Check Zero" position of these switches, each prevents the application of power to the hydrogen valve 60 and the sample valve 62 in either of the analyzer units by preventing completion of a control circuit 196 without which power is withheld from the hydrogen and sample valves at lines 188 and 192 by certain contacts within a sequence timer 190 presently to be described.

In the lower or "Check Cell" position, the switches 184 and 186 apply power to the hydrogen valves 60 of their respective analyzer units by means of a line 194. The sample valves remain de-energized in the Check Cell position of switches 184 and 186, and calibration of the combustibles meters is effected as before by connecting bottles of gas of known composition to the air inlet lines 66 of the analyzer units.

When both switches 184 and 186 are in the upper or Control position, the circuit 196 is completed within the control unit, subject to closing of relay 161. Relay 161 is energized for either position of relay 158 provided the switches 112 in the analyzer units are in the control position, subject only to the closed condition of a pair of limit switch contacts presently to be described, 232 for the analyzer unit 2 and 233 for the other analyzer unit.

With circuit 196 closed, the clutch coil 220 of the timer 190 is energized so that the motor 222 is coupled to a set of cam driven contacts, presently to be described.

Before however the switches 184 and 186 can properly be thrown to the Control position in which the apparatus effects automatic and substantially continuous correction of the air-fuel ratio of the combustion device, the settings of the intermediate contacts 146 and 148 and the values of the portions into which they divide the voltage divider 138 must be correctly adjusted, in order that the voltage at the second intermediate contact 148 as determined by the setting of that contact may properly correspond to the oxygen percentages in which the front panel control for contact 148 is graduated. With given bridge elements and energizing current, there is a definite relation between the oxygen concentration in the gas mixture passing through the test cell of the bridge 6 and the resulting voltage developed across the terminals 23 and 25. The energizing current can be set to a predetermined level by adjustment of the current adjusting resistor 92 and may be read at an ammeter 95. In a particular embodiment of the invention according to Figs. 1 and 1A which has been constructed, the voltage across the bridge was 25 millivolts when air (mixed with hydrogen) was passed through the oxygen bridge test cell. A concentration of 21 per cent oxygen therefore corresponded to 25 millivolts. Whatever the absolute value of the bridge unbalance signal voltage corresponding to oxygen in atmospheric concentration, the elements 140, 142 and 144 must be so adjusted that with the front panel control for contact 148 at 21 per cent oxygen, the same voltage will be developed between contact 148 and contact 146, which is connected to the junction 25. To achieve this state of adjustment, the applicable switch 184 or 186 is set to the Check Zero position. The oxygen bridge, assumed to be in balance with switch 152 in the Out position, next has the divider 138 connected across its current terminals by shift of the switch 152 to the Calibrate position. In this position, the intermediate contacts 146 and 148 are connected to input terminals 94 and 96 of a potentiometric voltage measuring device 98. This device is provided to repeat the output signals of both oxygen and combustibles bridges for recording or other purposes. Its input terminal 96 for the oxygen bridge signal is however wired through switch 152 in such a fashion that the device 98 receives the oxygen bridge signal only for the Out and for the In positions of that switch. With the switch in the Calibrate position, the input to terminals 94 and 96 consists of the potential difference between contacts 146 and 148. The device 98 includes a voltmeter in which the voltage so developed between terminals 94 and 96 can be read. With switch 152 in the Calibrate position, the intermediate contact 148 is set at the highest oxygen percentage for which its front panel control is calibrated, e. g. 21 per cent, and the resulting voltage is noted on the device 98. If the value falls short of that specified, e. g. 25 millivolts in the case referred to, the Scale Adjuster resistor 144 is reduced in value until a proper voltage is measured between the two intermediate contacts 146 and 148. The proper balance of the bridge must then be restored by adjusting the value of the Equalizer resistor 140 between the first intermediate contact 146 and the upper fixed terminal of the divider which is connected through switch 152 to current terminal 22 of the bridge. By this adjustment the ratio of the two parts into which divider 138 is divided by contact 146 is made again equal to the ratio of the ratio arms 18 and 20 of the oxygen bridge.

When the divider 138 has been properly adjusted, the apparatus is ready for automatic control. Such automatic control is effected by means of the sequence timer 190, an interval timer 240 and certain external signals applied at circuits 196 and 242 presently to be described, once the switches 184 and 186 are thrown to the Control position.

The circuit 196 is controlled by external apparatus not forming part of the invention to be energized during firings in both directions of the open hearth furnace illustrated in Fig. 2. The supply to circuit 196, which may be termed the reset supply, is interrupted briefly at each reversal of firing so as to de-energize the clutch coil 220. An additional source of control power which may be referred to as the Direction supply is connected to circuit 242. Circuit 242 is energized while the furnace is being fired in one direction and is de-energized while the furnace is being fired in the opposite direction. The contacts of relays 150, 154, 156, 158 and 160 are spring loaded to connect the control unit with the analyzer unit which is in use during the firings on which the circuit 242 is de-energized. Thus if the circuit 242 is de-energized while the furnace is being fired from the right, the contacts of the relays just referred to are spring loaded to connect the control unit with the analyzer at the left-hand side of the furnace.

The sequence timer 190 contains four pairs of contacts 224, 226, 228 and 230, the four phases Reset, Start, Sample and Hold of which are indicated at I, II, III and IV in the figure. With switches 184 and 186 thrown to the Control position, power passes from line 136 in the analyzer unit to a pair of zero adjuster limit switch contacts 232. Contacts 232 are normally closed, and are opened only when the Zero adjuster motor 84 drives the tap 73 on the Zero adjustment potentiometer 76 to the end of its travel so that correct zero adjustment can no longer be obtained. Assuming the contacts 232 to be closed, power is applied from line 136 in the analyzer unit to line 244 in series with contacts 232. This lights a control lamp 246 indicating proper operation of the automatic Zero adjuster and also applies power to a relay 161 whose contacts are inserted in the reset supply circuit 196. Except on the reversal of firing, clutch coil 220 is therefore energized, coupling motor 222 to its cam operated contacts 224, 226, 228 and 230.

During all but a small fraction such as the first minute of a firing of the furnace in one direction, which firing may last six or eight minutes for example, the contacts 224 to 230 are in the Hold position of phase IV. At the end of the firing, the reset supply 196 is briefly de-energized by the external mechanism which reverses the direction of firing of the furnace. Voltage is therefore removed from coil 220, and the sequence timer contacts are returned by a spring mechanism not shown to the reset position of phase I in which all are open.

Upon reestablishment of the reset supply a few seconds later, when the furnace begins firing in the opposite direction, contact is made, by action of the clutch coil, between contacts 224. This energizes the sequence timer motor 222, which immediately sets the sequence timer contacts to the condition shown at phase II. Motor 222 continues to turn. During phase II contacts 224 are closed, and power is applied via line 250 to the main field coil of the zero adjuster motor 84. Relays 174 and 180 are de-energized during phase II because of the open condition of contacts 226. This means that the hydrogen valve of the analyzer unit connected to the control unit is open, that the amplifier input terminal 170 is connected to intermediate contact 146, and that the amplifier output is connected to the shading coils of the zero adjuster motor 84. Because contacts 228 are also open during phase II, the sample valve 62 is de-energized, and air only is passed through the test cell of the oxygen bridge. Phase II is therefore the zero adjustment phase of the firing cycle, and it is employed to effect readjustment by motor 84 of the contact 73 on the zero adjuster voltage divider 76 as required to produce balance of the bridge while air is passed over its active catalyst arm 14.

At the end of phase II, which may last some fifteen seconds for example, motor 222 shifts the sequence timer contacts to the condition illustrated at phase III in which contacts 224, 226 and 228 are closed but in which contacts 230 are open. The closing of contacts 226 energizes the hydrogen valve via line 188. It also energizes relays 174 and 180 so that the amplifier is connected to the intermediate contact 148 on its input side and to the shading coils of motor 182 on its output side. In addition, the closed condition of contacts 228 energizes the sample valve 62 via line 192. Thus during phase III the exhaust gases to be analyzed are sent with a mixture of hydrogen through the test cell of the oxygen bridge and are sent with a mixture of air through the test cell of the combustibles bridge. No control of the air-fuel ratio of the combustion device is effected during phase III however because of the open condition of contacts 230. Contacts 230 control the application of power to an interval timer 240 and to its contacts 241, through which power must pass for application to the main field coil of the air fuel ratio control motor 182. Phase III is therefore employed to permit the gas mixture within the test cell of the oxygen bridge to attain an equilibrium truly representative of the exhaust gases in the exhaust stack to which the sample line 68 is connected.

At the beginning of phase IV, which may be something like one minute after the beginning of phase II, motor 222 closes contacts 230 and opens contacts 224, whereby motor 222 is itself de-energized. The opening of contacts 224 also removes power from the main field coil of the zero adjuster motor 84. Closing of contacts 230 however applies power to the interval timer 240. The timer 240 consists of a motor with a pair of cam operated contacts 241 coupled thereto through reduction gearing not shown. Its function is to permit energization of the air-fuel ratio control motor 182 for a few seconds at repeated intervals during the duration of phase IV, i. e. during the major fraction of each firing of the furnace. Thus the interval timer may be adjusted to permit closing of contacts 241 for a few seconds per minute. The interval timer is provided in order to prevent overcontrol and hunting by the motor 182.

A three-pole five-position switch 252 is provided by means of which the motor 182 can be manually operated in opposite directions at the extreme positions of the switch. In either of the intermediate positions the motor 182 is entirely de-energized, and automatic control is effected in the central position.

The invention has been described in terms of its application to a particular combustion device, namely an open hearth furnace which is fired successively from opposite sides. The invention is however applicable to combustion devices of other types, both simpler and more complicated. Combustion control can be effected according to the invention either with respect to unreacted oxygen or with respect to unoxidized or incompletely oxidized combustibles, or with respect to both. In the appended claims therefore the term "combustible component" has been used to designate, as the gaseous component whose concentration is to be measured and controlled, either oxygen or a combustible in the usual sense of the word such as carbon monoxide. Likewise these claims call for admixture with the combustible component so defined of a gas reactable therewith. In case the combustible component under analysis is oxygen as in the example of the invention which has been described, this reactable component may be hydrogen. In case the combustible component under analysis is carbon monoxide, the reactable component may be oxygen in the air which is drawn into the pump feeding the combustible bridge.

Likewise the invention does not depend on any particular form of timing apparatus nor on the control circuits such as those identified by reference characters 196 and 242 in Fig. 1A which belong to the open hearth furnace with respect to control of which the invention has been described hereinabove. Indeed in one of its aspects the invention does not require timing apparatus of any kind, and the automatic zero adjustment feature may be omitted.

I claim:

1. Gas analysis apparatus operating by catalytic combustion, said apparatus comprising a catalyst wire incorporated into a Wheatstone bridge circuit, a voltage source connected to two of the four terminals of said circuit, means to pass over said wire a mixture of a gas to be analyzed with a gas containing a component reactable with a combustible component of said gas to be analyzed, a first voltage divider having its fixed terminals connected to said two terminals, a connection between one of the third and fourth terminals of said circuit and a movable contact on said first voltage divider, a second voltage divider having its fixed terminals connected to said two terminals, a connection between one of said third and fourth terminals and an intermediate contact on said second voltage divider, a second intermediate contact on said second voltage divider, and voltage measuring means connected between the other of said third and fourth terminals and said second intermediate terminal.

2. Gas analysis apparatus operating by catalytic combustion, said apparatus comprising a catalyst wire incorporated into a Wheatstone bridge circuit, a voltage source connected to two of the four terminals of said circuit, means to pass over said wire a sample of a gas to be analyzed, means to add to said sample a gas containing a component reactable with a combustible component of said gas to be analysed, a first voltage divider connected between said two terminals, a connection between one of the third and fourth terminals of said circuit and a movable contact on said first voltage divider, a second voltage divider connected in parallel with said first voltage divider, a connection between a third of said terminals and a first intermediate contact on said second voltage divider, a second intermediate contact on said second voltage divider, an amplifier having one input terminal coupled to the fourth of said bridge terminals, a motor coupled to said movable contact on said first voltage divider, means to connect the other input terminal of said amplifier alternately in cyclical fashion to said first and second intermediate contacts, means to connect the output of said amplifier to said motor while the other input terminal of said amplifier is coupled to said first intermediate contact, and means to disable said gas-adding means while said other amplifier input terminal is coupled to said first intermediate contact.

3. Gas analysis apparatus operating by catalytic combustion, said apparatus comprising a Wheatstone bridge circuit including two fixed ratio arms, a third fixed arm and a catalytic wire in a fourth arm, a voltage source connected to two of the four terminals of said circuit, said two terminals being at the ends of the series connection of said ratio arms, means to pass over said catalyst wire a sample of a gas to be analyzed, means to add to said sample a gas containing a component reactable with a combustible component in said sample, a first voltage divider connected between said two terminals, a connection between the junction of said third and fourth arms and a movable contact on said first voltage divider, a second voltage divider connected between said two terminals, a connection between the junction of said ratio arms and a first intermediate contact on said second voltage divider, a second intermediate contact on said second voltage divider, an amplifier having one input terminal coupled to the junction of said third and fourth arms, a motor coupled to said movable contact, means to couple the other input terminal of said amplifier alternately in cyclical fashion to said first and second intermediate contacts, means to couple the output of said amplifier to said motor while the other input terminal of said amplifier is coupled to said first intermediate contact, and means to disable said gas-adding means while said other amplifier input terminal is coupled to said first intermediate contact.

4. In a combustion device including mechanism for regulating the ratio of air to fuel supplied to said device, apparatus for combustion control by analysis of the exhaust gases from said device for unreacted oxygen, said apparatus comprising a combustion catalyst wire incorporated into a Wheatstone bridge circuit, a voltage source connected to two of the four terminals of said circuit, means to pass over said wire a sample of the gas to be analyzed, intermittently operable means to add hydrogen to said sample, a first voltage divider having its fixed terminals connected to said two bridge circuit terminals, a connection between one of the third and fourth of said bridge terminals and a movable contact on said first voltage divider, a second voltage divider having its fixed terminals connected to said two bridge terminals, a connection between a third of said bridge terminals and a first intermediate contact on said second voltage divider, a second intermediate contact on said second voltage divider, an amplifier having one input terminal coupled to the fourth of said bridge terminals, a first motor coupled to the air-fuel ratio regulating mechanism of said combustion device, a second motor coupled to said movable contact, and cyclically operating timing mechanism coupling the other input terminal of said amplifier to said second intermediate contact, operating said hydrogen-adding means and coupling the output of said amplifier to said first motor during one phase of said cyclic operation, and coupling the other input terminal of said amplifier to said first intermediate contact, disabling said hydrogen-adding means and coupling the output of said amplifier to said second motor during another phase of said cyclic operation.

5. In a combustion device including mechanism for regulating the ratio of air to fuel supplied to said device, apparatus for combustion control by analysis of the exhaust gases from said device for a combustible component, said apparatus comprising a combustion catalyst wire incorporated into a Wheatstone bridge circuit, a voltage source connected to two of the four terminals of said circuit, means to pass over said wire a sample of the gas to be analyzed, intermittently operable means to add to said sample a gas reactable with said component, a first voltage divider having its fixed terminals connected to said two bridge circuit terminals, a connection between one of the third and fourth of said bridge terminals and a movable contact on said first voltage divider, a second voltage divider having its fixed terminals connected to said two bridge terminals, a connection between a third of said bridge terminals and a first intermediate contact on said second voltage divider, a second intermediate contact on said second voltage divider, an amplifier having one input terminal coupled to the fourth of said bridge terminals, a first motor coupled to the air-fuel ratio regulating mechanism of said combustion device, a second motor coupled to said movable contact, and cyclically operating timing mechanism coupling the other input terminal of said amplifier to said second intermediate contact, operating said reactable gas-adding means and coupling the output of said amplifier to said first motor during one phase of said cyclic operation, and coupling the other input terminal of said amplifier to said first intermediate contact, disabling said reactable gas-adding means and coupling the output of said amplifier to said second motor during another phase of said cyclic operation.

6. In a combustion device including mechanism for regulating the ratio of air to fuel supplied to said device, apparatus for combustion control by analysis of the exhaust gases from said device for a combustible component, said apparatus comprising a Wheatstone bridge into one arm of which a combustion catalyst wire is incorporated, a voltage source connected to two of the four terminals of said bridge, means to pass over said wire a sample of the gas to be analyzed, intermittently operable means to add to said sample a gas reactable with said component, a first voltage divider having its fixed terminals connected to said two terminals, a connection between that one of the third and fourth terminals of said bridge which is adjacent said one arm and a movable contact on said first voltage divider, a second voltage divider having its fixed terminals connected to said two bridge terminals, a connection between the other of said third and fourth bridge terminals and a first intermediate contact on said second voltage divider, a second intermediate contact on said second voltage divider, an amplifier having one input terminal coupled to said one of said third and fourth bridge terminals, a first motor coupled to the air-fuel ratio regulating mechanism of said combustion device, a second motor coupled to said movable contact, and cyclically operating timing mechanism coupling the other input terminal of said amplifier to said second intermediate contact, operating said reactable gas-adding means and coupling the output of said amplifier to said first motor during one phase of said cyclic operation, and coupling the other input terminal of said amplifier to said first intermediate contact, disabling said reactable gas-adding means and coupling the output of said amplifier to said second motor during another phase of said cyclic operation.

7. Gas analysis apparatus operating by catalytic combustion, said apparatus comprising a catalyst wire incorporated into one of the four arms of a Wheatstone bridge circuit, means to pass over said wire a mixture of a gas to be analyzed with a gas containing a component reactable with a combustible component of said gas to be analyzed, a first voltage divider having its fixed terminals connected to two of the four terminals of said bridge circuit, a connection between a third of said four terminals adjacent said one arm and a movable contact on said first voltage divider, a second voltage divider having its fixed terminals connected to said two bridge terminals, a connection between the fourth of said bridge terminals and an intermediate contact on said second voltage divider, a second intermediate contact on said second voltage divider, and voltage measuring means connected between said third bridge terminal and said second intermediate terminal on said second voltage divider.

References Cited in the file of this patent

UNITED STATES PATENTS

| | | |
|---|---|---|
| 1,379,266 | Keeler | May 24, 1921 |
| 1,770,059 | Barber | July 8, 1930 |
| 2,273,981 | Morgan et al. | Feb. 24, 1942 |
| 2,404,993 | Sullivan | July 30, 1946 |
| 2,607,576 | Harter | Aug. 19, 1952 |
| 2,617,716 | Hartline | Nov. 11, 1952 |